US012608106B2

(12) United States Patent
Sin et al.

(10) Patent No.: US 12,608,106 B2
(45) Date of Patent: Apr. 21, 2026

(54) DISPLAY DEVICE AND TOUCH DEVICE

(71) Applicant: SAMSUNG DISPLAY CO., LTD.,
Yongin-si (KR)

(72) Inventors: Yu Jin Sin, Yongin-si (KR); Hyun Wook Cho, Yongin-si (KR); Jae Woo Choi, Yongin-si (KR)

(73) Assignee: SAMSUNG DISPLAY CO., LTD.,
Yongin-si (KR)

( * ) Notice: Subject to any disclaimer, the term of this patent is extended or adjusted under 35 U.S.C. 154(b) by 17 days.

(21) Appl. No.: 18/736,245

(22) Filed: Jun. 6, 2024

(65) Prior Publication Data

US 2025/0156013 A1 May 15, 2025

(30) Foreign Application Priority Data

Nov. 9, 2023 (KR) ........................ 10-2023-0154431

(51) Int. Cl.
*G06F 3/041* (2006.01)
*G06F 3/044* (2006.01)
*G06F 3/14* (2006.01)

(52) U.S. Cl.
CPC ........ *G06F 3/04184* (2019.05); *G06F 3/0412* (2013.01); *G06F 3/04164* (2019.05); *G06F 3/0446* (2019.05); *G06F 3/1446* (2013.01)

(58) Field of Classification Search
None
See application file for complete search history.

(56) References Cited

U.S. PATENT DOCUMENTS

| | | | |
|---|---|---|---|
| 9,904,420 | B2 | 2/2018 | Kim et al. |
| 10,133,417 | B2 | 11/2018 | Seo et al. |
| 11,144,143 | B2 | 10/2021 | Kim et al. |
| 11,366,546 | B2 | 6/2022 | Lee et al. |
| 2006/0103635 | A1 | 5/2006 | Park |
| 2014/0184533 | A1 | 7/2014 | Park et al. |

(Continued)

FOREIGN PATENT DOCUMENTS

| KR | 10-0644650 | 11/2006 |
|---|---|---|
| KR | 10-1426376 | 7/2014 |

(Continued)

OTHER PUBLICATIONS

OA dated Dec. 8, 2025 issued in corresponding U.S. Appl. No. 18/678,005.

*Primary Examiner* — Duane N Taylor, Jr.
(74) *Attorney, Agent, or Firm* — F. CHAU & ASSOCIATES, LLC

(57) ABSTRACT

The display device includes a first display panel, a second display panel disposed adjacent to the first display panel, a first touch array disposed on the first display panel, a second touch array disposed on the second display panel, a first touch driver that applies a first touch driving signal to the first touch array in response to a frame synchronization signal, a second touch driver that applies a second touch driving signal to the second touch array in response to the frame synchronization signal, and a common line commonly connected to the first and second touch drivers to transmit the frame synchronization signal, wherein a frequency of pulses included in the first touch driving signal is different from a frequency of pulses included in the second touch driving signal.

20 Claims, 10 Drawing Sheets

(56)          References Cited

U.S. PATENT DOCUMENTS

| | | | |
|---|---|---|---|
| 2015/0077370 A1* | 3/2015 | Kim | G06F 3/0446 |
| | | | 345/173 |
| 2015/0339967 A1 | 11/2015 | Shin | |
| 2017/0046007 A1 | 2/2017 | Kitagawa et al. | |
| 2023/0117610 A1 | 4/2023 | Shin et al. | |
| 2023/0185401 A1* | 6/2023 | Lee | G06F 3/0445 |
| | | | 345/173 |

FOREIGN PATENT DOCUMENTS

| | | |
|---|---|---|
| KR | 10-2021-0086332 | 7/2021 |
| KR | 10-2349822 | 1/2022 |
| KR | 10-2092569 | 3/2022 |
| KR | 10-2023-0055328 | 4/2023 |
| KR | 10-2591836 | 10/2023 |

* cited by examiner

DISPLAY DEVICE AND TOUCH DEVICE

CROSS-REFERENCE TO RELATED APPLICATION

The present application claims priority under 35 U.S.C. § 119(a) to Korean Patent Application No. 10-2023-0154431 filed on Nov. 9, 2023, in the Korean Intellectual Property Office, the disclosure of which is incorporated by reference in its entirety herein.

TECHNICAL FIELD

The present disclosure relates to a display device and a touch device.

DISCUSSION OF RELATED ART

A display device is a connection medium between a user and information. Examples of the display device include an organic light emitting diode (OLED) display device and a liquid crystal display (LCD).

This display device may include a touch sensing function that allows interaction with a user in addition to an image displaying function. When the user touches a screen with a finger or a touch pen, the display device can sense information such as changes in pressure, charge or light through the touch sensing function. The display device may determine touch information, such as whether an object is touched on the screen or a touch position from the sensed information.

However, the touch sensing function may result in electronic magnetic interference (EMI) that reduces image quality or touch performance.

SUMMARY

Embodiments of the present disclosure may provide a display device and a touch device with increased quality.

A display device according to an embodiment of the present disclosure includes a first display panel, a second display panel, a first touch array, a second touch array, a first touch driver, a second touch driver and a common line. The second display panel is disposed adjacent to the first display panel. The first touch array is disposed on the first display panel. The second touch array is disposed on the second display panel. The first touch driver applies a first touch driving signal to the first touch array in response to a frame synchronization signal. The second touch driver applies a second touch driving signal to the second touch array in response to the frame synchronization signal. The common line commonly is connected to the first and second touch drivers to transmit the frame synchronization signal. A first frequency of pulses included in the first touch driving signal is different from a second frequency of pulses included in the second touch driving signal.

The first frequency may be set depending on signals from the first display panel, and the second frequency may be set depending on signals from the second display panel.

The common line may include a first common line transmitting the frame synchronization signal and a second common line transmitting a pulse synchronization signal, and the first and second touch drivers receive the frame synchronization through the first common line and the pulse synchronization signal through the second common line.

The first and second touch driving signals may be generated using pulses of the pulse synchronization signal.

The first and second touch driving signals may have different pulse widths.

The frame synchronization signal and the pulse synchronization signal may be pulse signals with different periods.

The first and second display panels may be disposed side by side in a first direction or a second direction different from the first direction to display one image.

A touch device according to an embodiment of the present disclosure includes a first touch array, a second touch array, a first touch driver, a second touch driver and a common line. The first touch driver applies a first touch driving signal to the first touch array in response to a frame synchronization signal. The second touch driver applies a second touch driving signal to the second touch array in response to the frame synchronization signal. The common line is commonly connected to the first and second touch drivers to transmit the frame synchronization signal. A first frequency of pulses included in the first touch driving signal is different from a second frequency of pulses included in the second touch driving signal.

The first frequency may be set depending on signals of a first display panel overlapping the first touch array, and the second frequency may be set depending on signals of a second display panel overlapping the second touch array.

The common line may include a first common line transmitting the frame synchronization signal and a second common line transmitting a pulse synchronization signal, and the first and second touch drivers receive the frame synchronization signal through the first common line and the pulse synchronization signal through the second common line.

The first and second touch driving signals may be generated using pulses of the pulse synchronization signal.

The first and second touch driving signals may have different pulse widths.

The frame synchronization signal and the pulse synchronization signal may be pulse signals with different periods.

A display device according to an embodiment of the present disclosure includes a first display panel, a second display panel, a first touch array, a second touch array, a first touch driver and a second touch driver. The second display panel is disposed adjacent to the first display panel. The first touch array is disposed on the first display panel. The second touch array is disposed on the second display panel. The first touch driver applies a first touch driving signal at a first frequency to the first touch array in response to a frame synchronization signal. The second touch driver applies a second touch driving signal at a second frequency different from the first frequency to the second touch array in response to the frame synchronization signal. The first frequency and the second frequency are frequencies that minimize an influence of noise caused by the touch driving signals acting on the first and second display panels.

BRIEF DESCRIPTION OF THE DRAWINGS

FIG. 3 is a block diagram schematically showing an embodiment of display units including display panels of FIG. 1.

FIG. 7 is a block diagram for illustrating an embodiment of signals provided to first and second touch drivers of FIG. 5.

FIG. 9 is a block diagram for illustrating an embodiment of signals provided to first and second touch drivers of FIG. 5.

FIG. 10 is a timing diagram showing an embodiment of first and second touch driving signals applied to touch arrays of FIG. 9.

DETAILED DESCRIPTION

Figure 1:
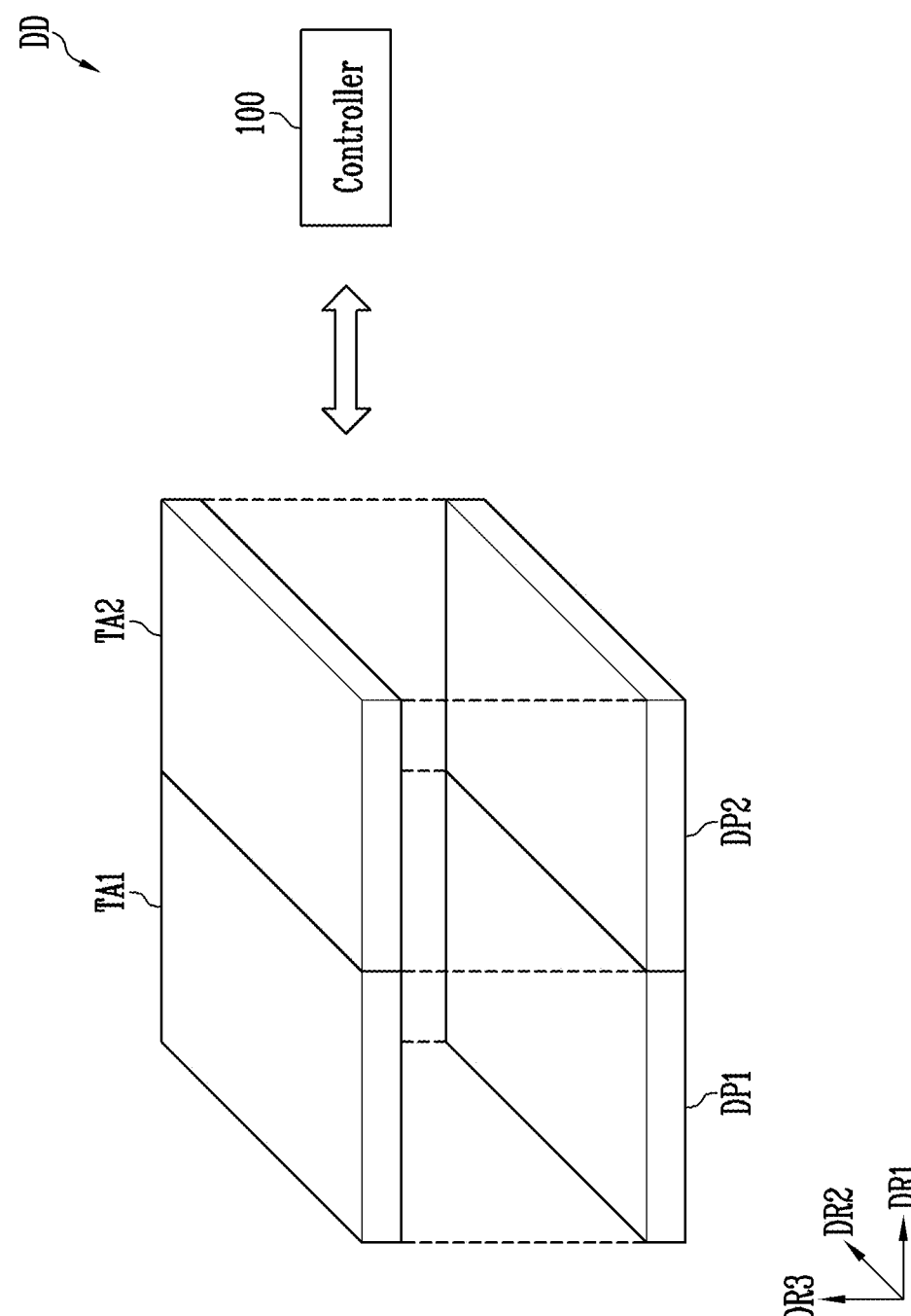
FIG. 1 is a perspective view showing a display device according to an embodiment of the present disclosure.

Embodiments of the present disclosure will now be described more fully hereinafter with reference to the accompanying drawings. However, the present disclosure may be embodied in different forms and should not be construed as limited to the embodiments set forth herein.

It will be understood that when an element is referred to as being "between" two elements, it can be the only element between the two elements, or one or more intervening elements may also be present. Like reference numerals may refer to like elements throughout.

Throughout the specification, when a part is said to be "connected" to another part, this includes not only the case where it is "directly connected" but also the case where it is "indirectly connected" with another element therebetween. "At least one of X, Y, and Z", and "at least one selected from the group consisting of X, Y, and Z" may be interpreted as an X, a Y, a Z, or any combination (e.g., XYZ, XYY, YZ, and ZZ) of two or more among X, Y, and Z. Here, "and/or" includes any combination of one or more of the constituents.

FIG. 1 is a perspective view showing a display device according to an embodiment of the present invention.

Referring to FIG. 1, the present invention may be applied to the display device DD when the display device DD is an electronic device in which a display surface is applied to one side thereof and a plurality of display panels are connected to each other such as a smartphone, a television, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a medical equipment, a camera, a wearable, and the like.

The display device DD may include a first touch array TA1, a second touch array TA2, a first display panel DP1, and a second display panel DP2. Additionally, the display device DD may further include a controller 100 (e.g., a controller circuit).

The display device DD may include first and second touch arrays TA1 and TA2 for sensing a touch, a pressure, a fingerprint, a hovering, etc., and first and second display panels DP1 and DP2 for displaying images.

In an embodiment of the present disclosure, for convenience of description, each of the first touch array TA1, the second touch array TA2, the first display panel DP1, and the second display panel DP2 of the display device DD may be shown as a rectangular shape with a pair of long sides and a pair of short sides. In this case, an extension direction of the long side may be displayed as the second direction DR2, an extension direction of the short side may be displayed as the first direction DR1, and a direction perpendicular to an extension direction of the long side and the short side may be displayed as the third direction DR3. The first to third directions DR1, DR2, and DR3 may refer to directions indicated by the first to third directions DR1, DR2, and DR3, respectively.

In FIG. 1, the display device DD is shown as including two first and second display panels DP1 and DP2, and two first and second touch arrays TA1 and TA2, but is limited thereto. For example, the display device DD may include three or more display panels and three or more touch arrays.

Referring to FIG. 1, the first display panel DP1 and the second display panel DP2 may be disposed side by side in the first direction DR1. For example, the first display panel DP1 may be disposed adjacent to the second display panel DP2. Additionally, the first touch array TA1 and the second touch array TA2 may overlap the first display panel DP1 and the second display panel DP2, respectively. However, the present disclosure is not limited thereto. For example, the first touch array TA1 and the second touch array TA2 may be disposed side by side not only in the first direction DR1 but also in the second direction DR2.

In an embodiment, the first touch array TA1 is disposed on the first display panel DP1 in the third direction DR3. Additionally, the second touch array TA2 may be disposed on the second display panels DP1 and DP2 in the third direction DR3. In an embodiment, the first touch array TA1 may be disposed under the first display panel DP1. Additionally, the second touch array TA2 may be disposed under the second display panels DP1 and DP2.

The first and second display panels DP1 and DP2 and the first and second touch arrays TA1 and TA2 may be manufactured separately from each other and then disposed and/or combined so that at least one area thereof overlaps each other. Alternatively, the first and second display panels DP1 and DP2 and the first and second touch arrays TA1 and TA2 may be manufactured integrally. For example, the first and second touch arrays TA1 and TA2 may be formed directly on at least one substrate constituting the first and second display panels DP1 and DP2 (e.g., upper and/or lower substrate of the display panel, or thin film encapsulation (TFE) layer, or another insulating layer or various functional films (e.g., optical layer or protective layer).

In embodiments, the first and second display panels DP1 and DP2 may be implemented as a display panel capable of generating self-emitting light, such as an organic light emitting display panel (OLED panel) that uses an organic light emitting diode as a light emitting element, an ultra-small light emitting diode display panel (Nano-scale LED Display panel) that uses an ultra-small light emitting diode as a light emitting element, and a quantum dot organic light emitting display panel (QD OLED panel) that uses a quantum dot and an organic light emitting diode. Additionally, the first and second display panels DP1 and DP2 may be implemented as non-emissive display panels such as a liquid crystal display panel (LCD panel) and an electro-phoretic display panel (EPD panel). When non-emissive display panels are used as the first and second display panels DP1 and DP2, the display device DD may include a backlight unit that supplies light to the display panel DP. However, this is an example and is not limited thereto.

In embodiments, the first and second touch arrays TA1 and TA2 may be implemented as the same type of touch array. Additionally, the first and second touch arrays TA1 and TA2 may be implemented as a touch panel such as a capacitive type touch panel, a resistive type touch panel, an optical touch panel, a surface acoustic wave touch panel, a pressure touch panel or a hybrid touch panel. However, this is an example and is not limited thereto.

The controller 100 may be connected to the first and second display panels DP1 and DP2 and the first and second touch arrays TA1 and TA2. The controller 100 may include a display driver 200 (see FIG. 2) and a touch driver 300 (see FIG. 2). For example, the display driver 200 (e.g., a first driver circuit) may be electrically connected to the first and second display panels DP1 and DP2 to drive pixels. The touch driver 300 (e.g., a second driver circuit) may be electrically connected to the first and second touch arrays TA1 and TA2 to apply touch driving signals. The controller 100 can control overall operations of the display device DD through the display driver 200 and the touch driver 300. Details about the controller 100 will be described later with reference to FIG. 2.

Figure 2:
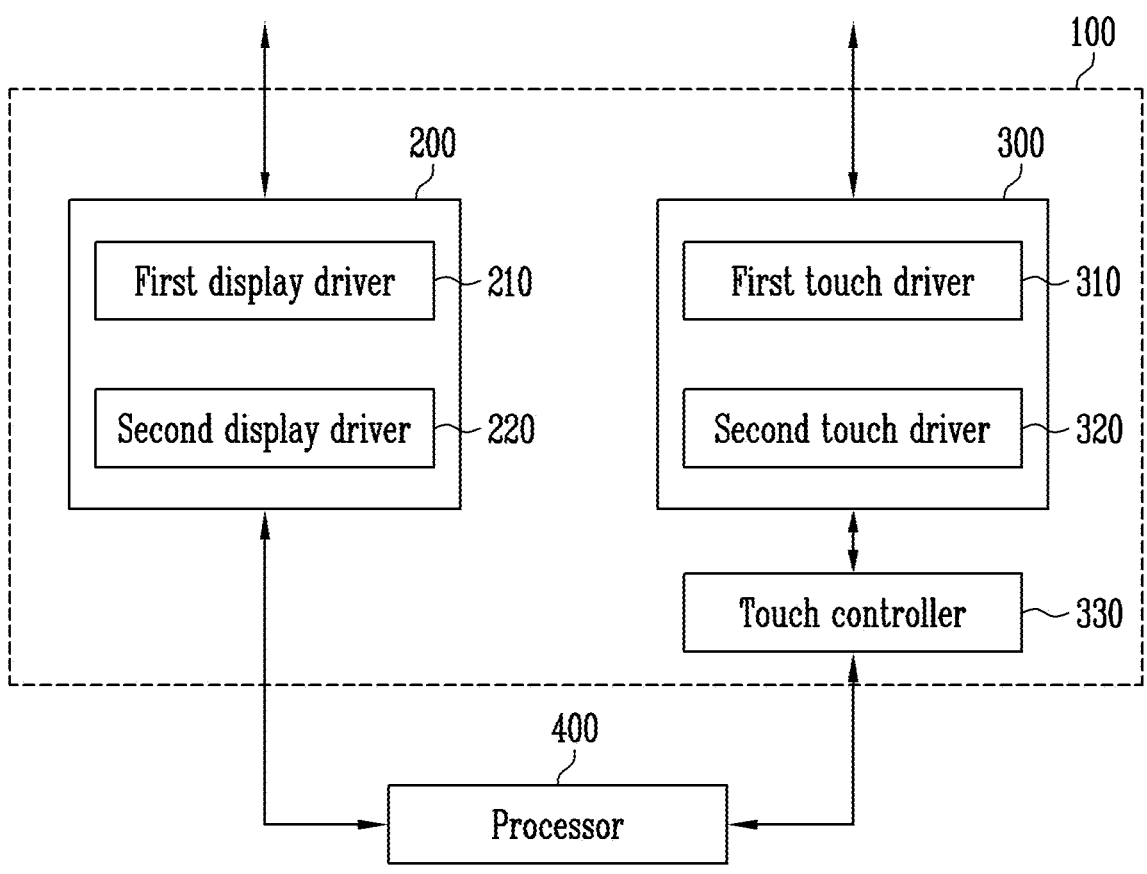
FIG. 2 is a block diagram showing an embodiment of a controller of FIG. 1.

FIG. 2 is a block diagram showing an embodiment of a controller of FIG. 1.

Referring to FIG. 2, the controller 100 may include the display driver 200 and the touch driver 300. Additionally, the controller 100 may further include a touch controller 330 (e.g., a controller circuit) for controlling the touch driver 300.

In an embodiment, the display driver 200 and the touch driver 300 may be configured of separate integrated chips (ICs) and may be driven independently. In another embodiment, at least a portion of the display driver 200 and the touch driver 300 may be integrated on one IC and they may be driven in conjunction with each other.

The display driver 200 may control an image display operation of the first and second display panels DP1 and DP2. The display driver 200 may include a first display driver 210 (e.g., a first display driver circuit) for driving the first display panel DP1 and a second display driver 220 (e.g., a second display driver circuit) for driving the second display panel DP2. For example, the first display driver 210 may control the image display operation of the first display panel DP1 by applying a driving signal to the first display panel DP1 (see FIG. 1). The second display driver 220 may control the image display operation of the second display panel DP2 (see FIG. 1) by applying a driving signal to the second display panel DP2.

The touch driver 300 may sense touch positions on the first and second touch arrays TA1 and TA2. The touch driver 300 may include a first touch driver 310 (a first touch driver circuit) for driving the first touch array TA1 and a second touch driver 320 (e.g., a second touch driver circuit) for driving the second touch array TA2. For example, the first touch driver 310 may apply first touch driving signals to the first touch array TA1 (see FIG. 1) in response to a frame synchronization signal. The first touch driver 310 may detect the touch position on the first touch array TA1 using a first sensing signal received from the first touch array TA1. The first sensing signal may be received in response to the first touch driving signals. The second touch driver 320 may apply second touch driving signals to the second touch array TA2 (see FIG. 1) in response to the frame synchronization signal. The second touch driver 320 may detect the touch position on the second touch array using a sensing signal received from the second touch array TA2. The second sensing signal may be received in response to the second touch driving signals.

The touch controller 330 may receive the detected touch position and transmit the detected touch position to the processor 400.

The touch controller 330 may apply a frame synchronization signal to the first and second touch drivers 310 and 320. In an embodiment, the touch controller 330 applies the frame synchronization signal through a common line commonly connected to the first and second touch drivers 310 and 320. The touch controller 330 can synchronize the first and second touch driving signals by commonly applying the frame synchronization signal to the first and second touch arrays TA1 and TA2. Accordingly, noise causing EMI interference generated when applying the first and second touch driving signals to the first and second touch arrays TA1 and TA2, can be reduced.

In an embodiment, the touch controller 330 may further apply a pulse synchronization signal through the common line.

While the touch controller 330 is illustrated in FIG. 2 as being configured separately from the touch driver 300, embodiments are not limited thereto. For example, the touch controller 330 may be included in at least one of the first and second touch drivers 310 and 320, or may be included in the processor 400 for the display device DD.

The processor 400 may receive the touch position from the touch controller 330 and perform various operations. For example, the processor 400 may process image data for display on the first and second display panels DP1 and DP2 depending on the touch position. The processor 400 may transmit the processed image data to the display driver 200. For example, the processor 400 may be implemented as an integrated circuit (IC), an application processor (AP), a mobile AP, or a processor capable of controlling the operations of the display driver 200 and the touch driver 300, but is not limited thereto.

Figure 3:
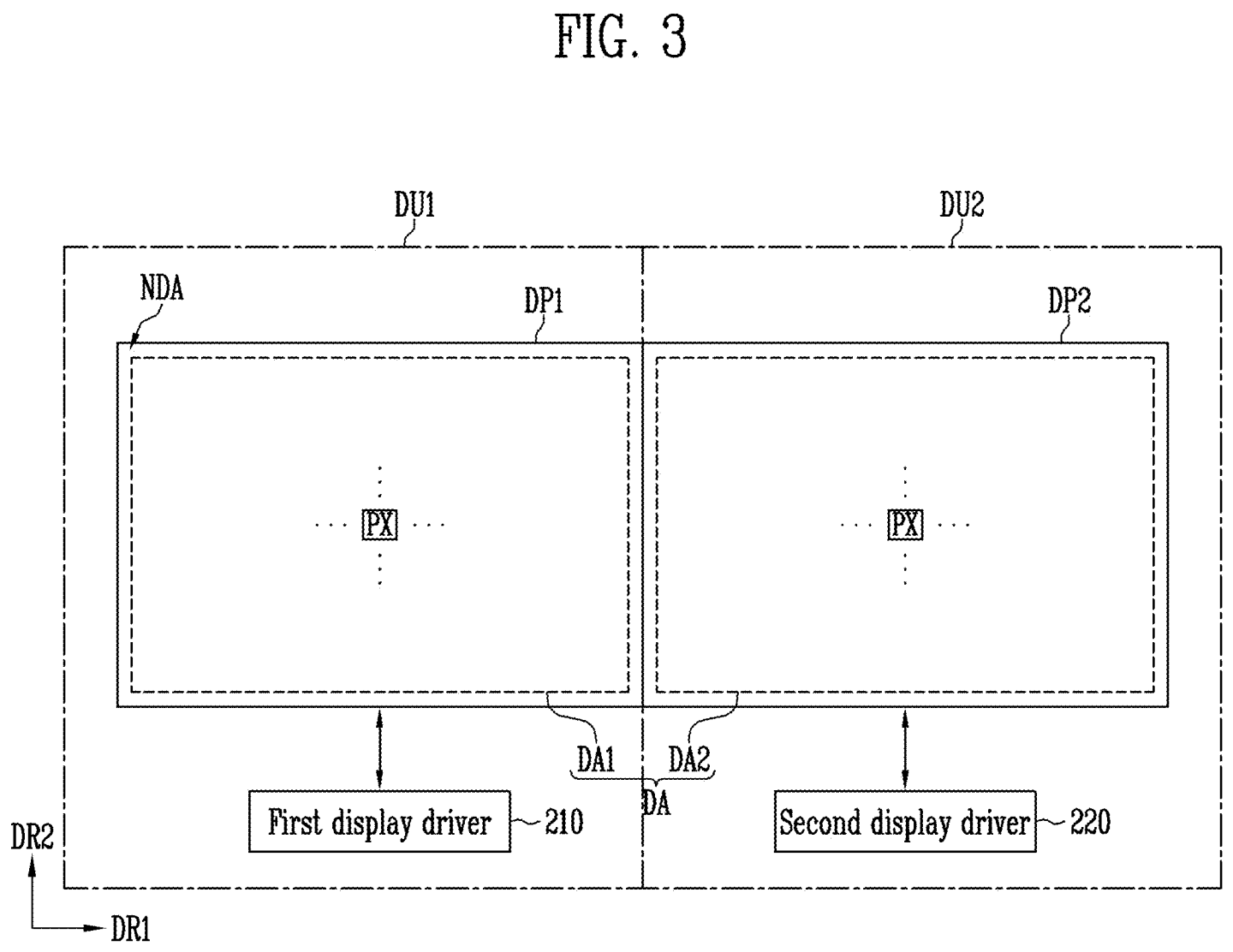

FIG. 3 is a block diagram schematically showing an embodiment of display units including the display panels of FIG. 1.

Referring to FIG. 3, the display device DD may include a first display unit DU1 and a second display unit DU2. Additionally, the first display unit DU1 may include a first display panel DP1 and a first display driver 210 for driving the first display panel DP1. The second display unit DU2 may include a second display panel DP2 and a second display driver 220 for driving the second display panel DP2.

The first display panel DP1 of the first display unit DU1 and the second display panel DP2 of the second display unit DU2 may be physically connected to each other. The first and second display panels DP1 and DP2 may be disposed side by side in the first direction to divide and display one image. Alternatively, the first and second display panels DP1 and DP2 may be disposed side by side in the first direction to display different individual images.

Each of the first and second display panels DP1 and DP2 may include a display area DA where an image is displayed and a non-display area NDA outside the display area DA. According to embodiments, the first display panel DP1 may include a first display area DA1. The second display panel DP2 may include a second display area DA2. For example, the first display area DA1 may be dispose in a center area of the first display panel DP1, and the second display area DA2 may be disposed in a center area of the second display panel DP2. The non-display area NDA may be disposed at an edge area of the first and second display panels DP1 and DP2 to surround the display area DA.

In each of the first and second display areas DA1 and DA2, pixels PX, and scan lines SL1 to SLn (see FIG. 4) and data lines DL1 to DLm (see FIG. 4) electrically connected to the pixels PX, may be disposed.

The pixels PX may be configured to receive data signals from the data lines DL1 to DLm based on turn-on level scan signals supplied from the scan lines SL1 to SLn, and to emit light with a brightness corresponding to the data signals. Accordingly, an image corresponding to the data signal may be displayed in the display area DA. However, the structure and driving method of the pixels PX are not limited thereto. For example, each of the pixels PX may be implemented as a pixel employing various structures and driving methods.

Various wires and/or a built-in circuitry connected to the pixels PX of the display area DA may be disposed in the non-display area NDA. For example, a number of lines for supplying various power and control signals to the display area DA may be disposed in the non-display area NDA. Additionally, first and second display drivers 210 and 220 for driving the first and second display panels DP1 and DP2 may be disposed in the non-display area NDA.

The first display driver 210 may be electrically connected to the first display panel DP1 and drive the pixels PX of the first display area DA1. The second display driver 220 may be electrically connected to the second display panel DP2 and drive the pixels PX of the second display area DA2.

Figure 4:
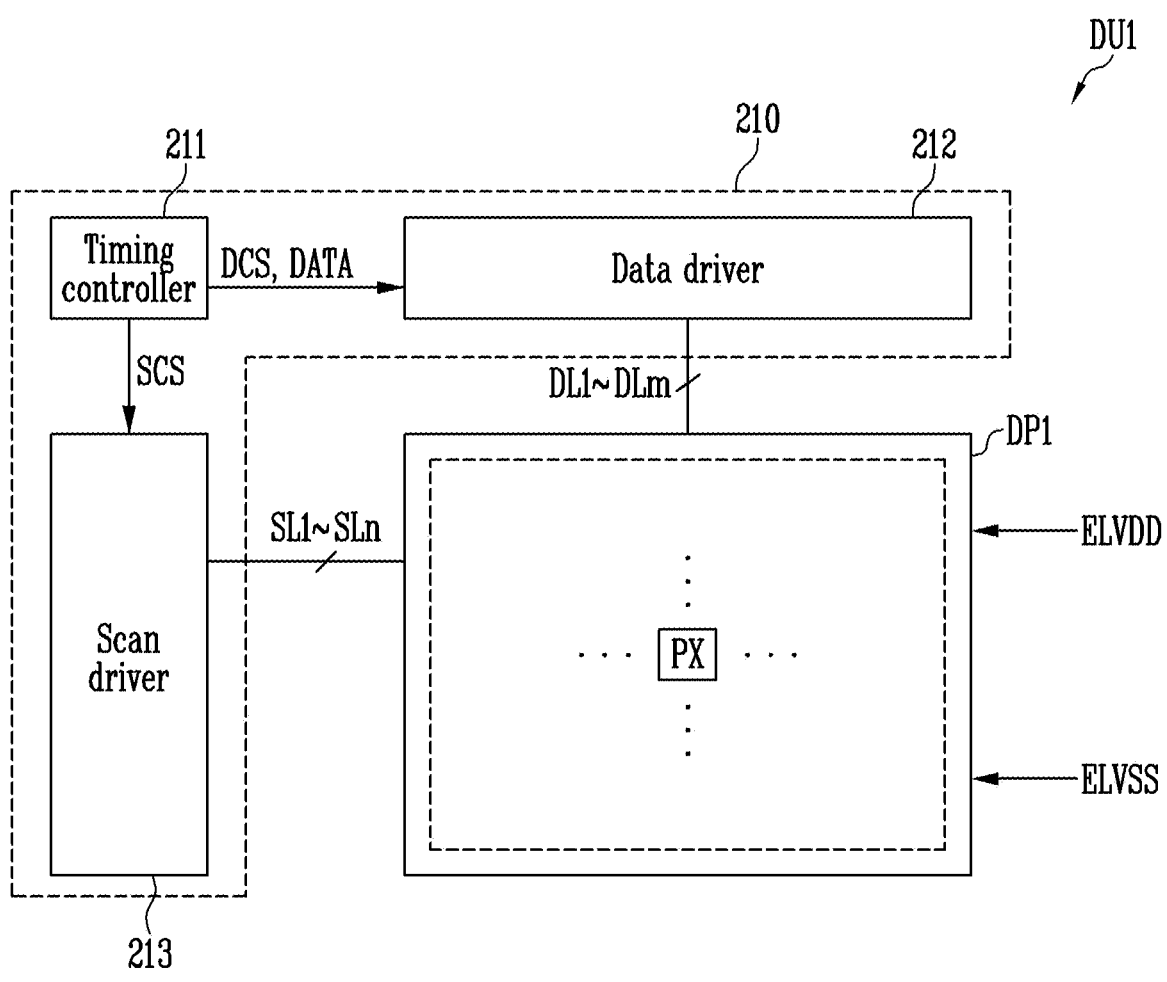
FIG. 4 is a block diagram showing an embodiment of one of the display units of FIG. 3.

FIG. 4 is a block diagram showing an embodiment of one of the display units of FIG. 3.

Referring to FIG. 4, the first display unit DU1 may include a first display panel DP1 and a first display driver 210. Additionally, the first display driver 210 may include a timing controller 211 (e.g., a controller circuit), a data driver 212 (e.g., a driver circuit), and a scan driver 213 (e.g., a driver circuit). Hereinafter, the configurations of the first display unit DU1 will be described, but these may also be applied to the second display units DU2.

The timing controller 211 may generate control signals for controlling the data driver 212 and the scan driver 213 using an external input signal received from the processor 400 (see FIG. 2). For example, the control signals may include a scan driver control signal SCS for controlling the scan driver 213 and a data driver control signal DCS for controlling the data driver 212. The external input signal received from the processor 400 may include a signal including touch position information on the first touch array TA1 (see FIG. 1) in addition to image data.

The timing controller 211 may supply the scan driver control signal SCS to the scan driver 213 and the data driver control signal DCS to the data driver 212. Additionally, the timing controller 211 may convert image data input from outside into an image data signal that meets the specifications of the data driver 212 and supply it to the data driver 212.

According to an embodiment, the first display panel DP1 may include pixels PX, data lines DL1 to DLm (m is an integer of 2 or more) connected to the pixels PX, and scan lines SL1 to SLn (n is defined independently of m and is an integer of 2 or more).

The data driver 212 may receive a data driver control signal DCS and image data DATA from the timing controller 211 and generate a data signal. Additionally, the data driver 212 may supply the generated data signal to the data lines DL1 to DLm. For connection to the data lines DL1 to DLm, the data driver 212 may be mounted directly on the substrate on which the pixels PX are formed, or may be connected to the substrate through a separate component such as a flexible circuit board.

The scan driver 213 may supply scan signals to the scan lines SL1 to SLn in response to the scan driver control signal SCS. For example, the scan driver 213 may sequentially supply scan signals to the scan lines SL1 to SLn. For connection to the scan lines SL1 to SLn, the scan driver 213 may be mounted directly on the substrate on which the pixels PX are formed, or may be connected to the substrate through a separate component such as a flexible circuit board.

For example, when a scan signal is supplied to a specific scan line, some of the pixels PX connected to the specific scan line may receive the data signal transmitted from the data lines DL1 to DLm, and some of the pixels PX may emit light with luminance corresponding to the supplied data signal.

Although the timing controller 211, data driver 212, and scan driver 213 are shown individually in FIG. 4, at least some of the components may be integrated as needed.

An electrode to which the voltage and/or signal that drives the first display panel DP1 is supplied may be referred to as a panel electrode. The panel electrodes may be data lines DL1 to DLm, scan lines SL1 to SLn, a first power source ELVDD or a second power source ELVSS. A driving voltage may be supplied to the panel electrode. For example, the pixels PX may generate light corresponding to a data signal by current flowing from the first power source ELVDD to the second power source ELVSS through the light emitting element. The first power source ELVDD may be a high potential voltage, and the second power source ELVSS may be a low potential voltage.

Figure 5:
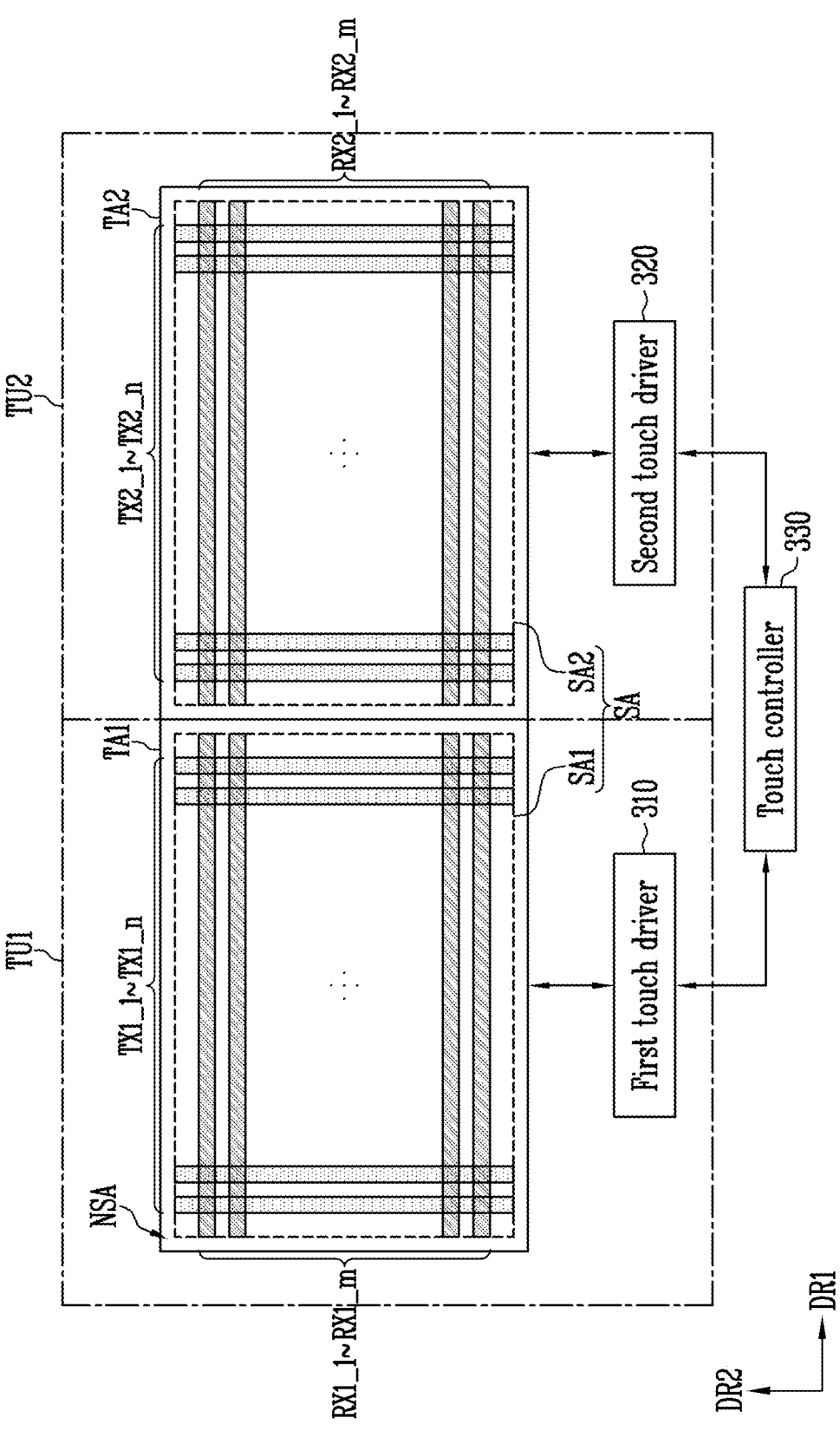
FIG. 5 is a block diagram schematically showing an embodiment of touch units including touch arrays of FIG. 1.

FIG. 5 is a block diagram schematically showing an embodiment of touch units including touch arrays of FIG. 1.

Referring to FIG. 5, the display device DD may include a first touch unit TU1 and a second touch unit TU2. Additionally, the first touch unit TU1 may include a first touch array TA1 and a first touch driver 310 for driving the first touch array TA1. The second touch unit TU2 may include a second touch array TA2 and a second touch driver 320 for driving the second touch array TA2.

The first touch array TA1 of the first touch unit TU1 and the second touch array TA2 of the second touch unit TU2 may be physically connected to each other. The first and second touch arrays TA1 and TA2 may be disposed to overlap the first and second display panels DP1 and DP2 of FIG. 3, respectively. Additionally, the first and second touch arrays TA1 and TA2 may detect touch positions on the first and second touch arrays TA1 and TA2, respectively.

Each of the first and second touch arrays TA1 and TA2 may include a sensing area SA and a non-sensing area NSA outside the sensing area SA. According to embodiments, the first touch array TA1 may include a first sensing area SA1. The second touch array TA2 may include a second sensing area SA2. For example, the first sensing area SA1 may be disposed to overlap the first display area DA1 in the central area of the first touch array TAL. The second sensing area SA2 may be disposed to overlap the second display area DA2 in the central area of the second touch array TA2. The non-sensing area NSA may be disposed at the edge areas of the first and second touch arrays TA1 and TA2 to surround the sensing area SA.

The sensing area SA is an area (i.e., active area) that can respond to a touch input. Touch electrodes and sensing electrodes for sensing the touch input may be disposed in the sensing area SA. For example, the touch electrodes and the sensing electrodes may be disposed to cross each other and sense a touch input using a mutual capacitance method or a self capacitance method.

According to an embodiment, the first sensing area SA1 includes 1_1-th to 1_n-th touch electrodes TX1_1 to TX1_n (n is an integer of 2 or more) and 1_1-th to 1_m-th sensing electrodes RX1_1 to RX1_m (m is defined independently of n and is an integer of 2 or more). For example, the 1_1-th to 1_n-th touch electrodes TX1_1 to TX1_n may be sequentially disposed in the first direction DR1 and may extend in the second direction DR2. Each of the 1_1-th to 1_n-th touch electrodes TX1_1 to TX1_n may form a touch column.

Additionally, the 1_1-th to 1_m-th sensing electrodes RX1_1 to RX1_m may be sequentially disposed in the second direction DR2 and may extend in the first direction DR1. Each of the 1_1-th to 1_m-th sensing electrodes RX1_1 to RX1_m may form a sensing row.

The second sensing area SA2 may include 2_1-th to 2_n-th touch electrodes TX2_1 to TX2_n and 2_1-th to 2_m-th sensing electrodes RX2_1 to RX2_m. For example, the 2_1-th to 2_n-th touch electrodes TX2_1 to TX2_n may be sequentially disposed in the first direction DR1 and may extend in the second direction DR2. Additionally, the 2_1-th to 2_m-th sensing electrodes RX2_1 to RX2_m may be sequentially disposed in the second direction DR2 and may extend in the first direction DR1.

Touch electrode lines TXL (see FIG. 6) and sensing electrode lines RXL (see FIG. 6) may be disposed in the non-sensing area NSA. The non-sensing area NSA may surround at least a portion of the first and second detection areas SA1 and SA2. A pad area may be disposed in the non-sensing area NSA. The pad area may be disposed on one side of the first and second sensing areas SA1 and SA2.

The first touch driver 310 may be electrically connected to the first touch array TA1 and the touch controller 330.

The first touch driver 310 may receive a frame synchronization signal from the touch controller 330. The first touch driver 310 may further receive a pulse synchronization signal from the touch controller 330. Additionally, the first touch driver 310 may apply first touch driving signals to the first touch array TA1 in response to the frame synchronization signal. Here, the first touch driving signals may be generated using pulses of the pulse synchronization signal.

The first touch driver 310 may receive a sensing signal from the first touch array TA1. For example, the first touch driver 310 may sense the mutual capacitances of the 1_1-th to 1_n-th touch electrodes TX1_1 to TX1_n and the 1_1-th to 1_m-th sensing electrodes RX1_1 to RX1_m through the received sensing signals. For example, in the sensing area SA1, at least one of the mutual capacitances between the 1_1-th to 1_n-th touch electrodes TX1_1 to TX1_n and the 1_1-th to 1_m-th sensing electrodes RX1_1 to RX1_m depending on the touch position of the user's finger, etc. may change. Accordingly, at least one of the received sensing signals may change. The first touch driver 310 may detect the touch position using a difference between these sensing signals.

The second touch driver 320 may receive a frame synchronization signal from the touch controller 330. The second touch driver 320 may further receive a pulse synchronization signal from the touch controller 330. The frame synchronization signal and the pulse synchronization signal may be signals that are equally applied to the first touch driver 310 and the second touch driver 320. Additionally, the second touch driver 320 may also apply a second touch driving signal to the second touch array TA2 in response to the frame synchronization signal. Here, the second touch driving signal may be generated using pulses of the pulse synchronization signal.

The second touch driver 320 may receive a sensing signal from the second touch array TA2. For example, the second touch driver 320 may sense the mutual capacitances of the 2_1-th to 2_n-th touch electrodes TX2_1 to TX2_n and the 2_1-th to 2_m-th sensing electrodes RX2_1 to RX2_m through the received sensing signals. For example, in the sensing area SA2, at least one of the mutual capacitances between the 2_1-th to 2_n-th touch electrodes TX2_1 to TX2_n and the 2_1-th to 2_m-th sensing electrodes RX2_1 to RX2_m depending on the touch position of the user's finger, etc. may change. Accordingly, at least one of the received sensing signals may change. The second touch driver 320 may detect the touch position using a difference between these sensing signals.

Figure 6:
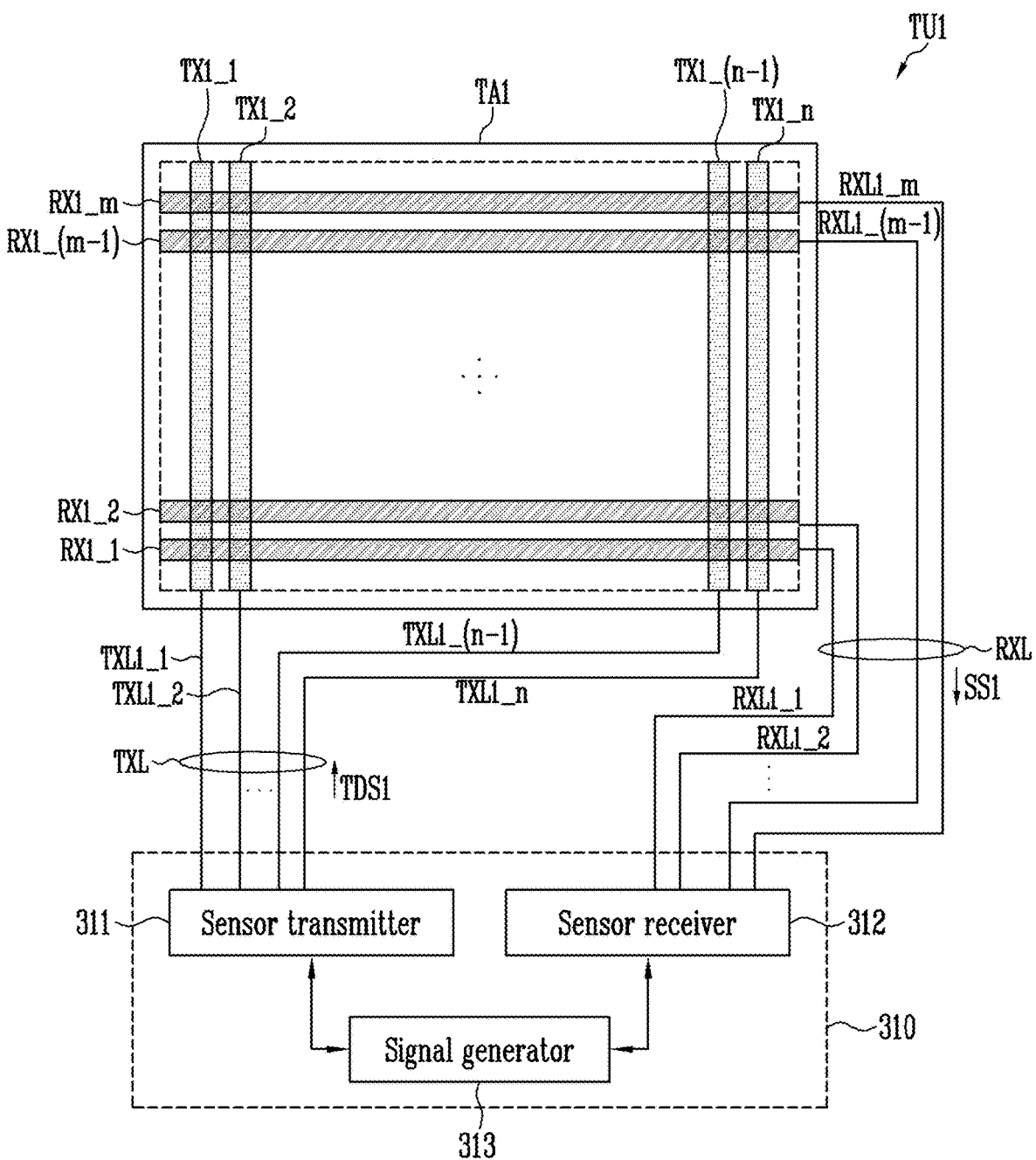
FIG. 6 is a block diagram showing an embodiment of one of the touch units of FIG. 5.

FIG. 6 is a block diagram showing an embodiment of one if the touch units of FIG. 5.

Referring to FIG. 6, the first touch unit TU1 may include a first touch array TA1 and a first touch driver 310. Additionally, the first touch driver 310 may include a sensor transmitter 311, a sensor receiver 312, and a signal generator 313. Hereinafter, while the configurations of the first touch unit TU1 are described, these may be equally applied to the second touch unit TU2.

The sensor transmitter 311 may be connected to the 1_1-th to 1_n-th touch electrodes TX1_1 to TX1_n and may supply the first touch driving signals TDS1 to the 1_1-th to 1_n-th touch electrodes TX1_1 to TX1_n. According to the embodiment, each of the 1_1-th to 1_n-th touch electrodes TX1_1 to TX1_n may be electrically connected to the 1_1-th to 1_n-th touch electrode lines TXL1_1 to TXL1_n. Additionally, the sensor transmitter 311 may be connected to the 1_1-th to 1_n-th touch electrodes TX1_1 to TX1_n through the 1_1-th to 1_n-th touch electrode lines TXL1_1 to TXL1_n.

The sensor transmitter 311 may receive first touch driving signals TDS1 from the signal generator 313. Additionally, the sensor transmitter 311 may sequentially apply the first touch driving signals TDS1 to each of the 1_1-th to 1_n-th touch electrodes TX1_1 to TX1_n.

The sensor receiver 312 may be connected to the 1_1-th to 1_m-th sensing electrodes RX1_1 to RX1_m and may receive the first sensing signals SS1 from the 1_1-th to 1_m-th sensing electrodes RX1_1 to RX1_m. According to the embodiment, each of the 1_1-th to 1_m-th sensing electrodes RX1_1 to RX1_m may be electrically connected to the 1_1-th to 1_m-th sensing electrode lines RXL1_1 to RXL1_m. Additionally, the sensor receiver 312 may be connected to the 1_1-th to 1_m-th sensing electrodes RX1_1 to RX1_m through the 1_1-th to 1_m-th sensing electrode lines RXL1_1 to RXL1_m.

The sensor receiver 312 may include a plurality of sensor channels connected to the 1_1-th to 1_m-th sensing electrode lines RXL1_1 to RXL1_m. The sensor channels may receive the first sensing signals SS1 through the 1_1-th to 1_m-th sensing electrode lines RXL1_1 to RXL1_m. In an embodiment, the number of sensor channels of the sensor receiver 312 and the number of 1_1-th to 1_m-th sensing electrode lines RXL1_1 to RXL1_m are the same and may be connected one to one. In another embodiment, when the number of sensor channels of the sensor receiver 312 is smaller than the number of 1_1-th to 1_m-th sensing electrode lines RXL1_1 to RXL1_m, the sensor channels may be time-divisionally connected to the 1_1-th to 1_m-th sensing electrode lines RXL1_1 to RXL1_m through a multiplexer.

Additionally, the sensor receiver 312 may receive and process (e.g., demodulate and filter) the first sensing signals SS1 of various frequencies. For example, the sensor receiver 312 may demodulate the first sensing signals SS1 using demodulation clock signals.

The signal generator 313 may receive a frame synchronization signal and a pulse synchronization signal from the touch controller 330 (see FIG. 5). The signal generator 313 may internally generate a basic clock signal based on the received signal and generate first touch driving signals TDS1 to be synchronized to the basic clock signal. That is, the signal generator 313 may generate first touch driving signals TDS1 including pulses. For example, the signal generator 312 may generate the first touch driving signals TDS1 in response to the frame synchronization signal using pulses of the pulse synchronization signal.

The signal generator 313 may be electrically connected to the sensor transmitter 311 and the sensor receiver 312. The signal generator 313 may supply first touch driving signals TDS1 to the sensor transmitter 311 and demodulated clock signals to the sensor receiver 312.

Figure 7:
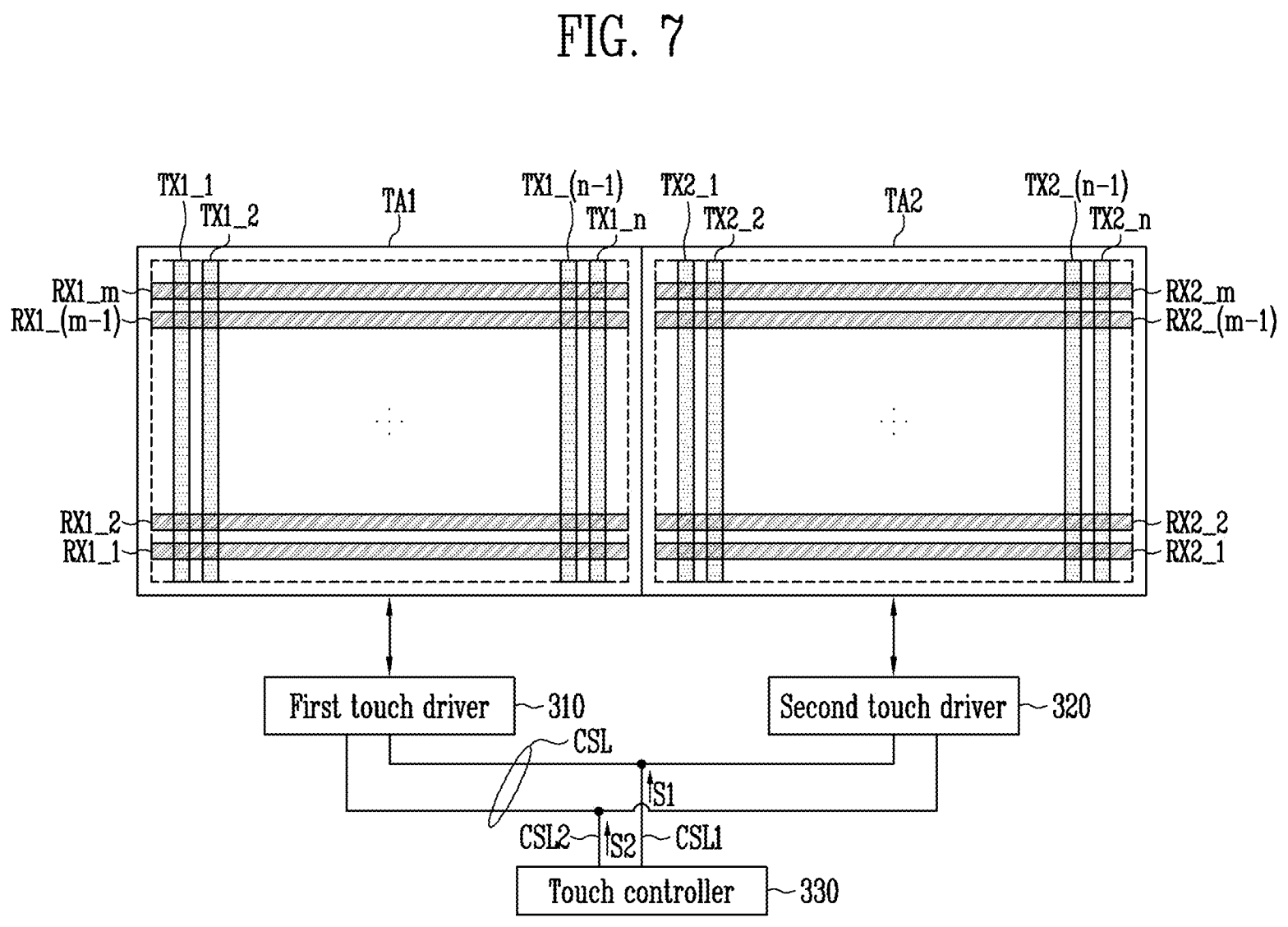

FIG. 7 is a block diagram for illustrating an embodiment of signals provided to first and second touch drivers of FIG. 5.

Referring to FIG. 7, the display device DD may include one or more common lines CSL commonly connected to the first touch driver 310 and the second touch driver 320. In an embodiment, the common lines CSL include a first common line CSL1 transmitting the frame synchronization signal S1 and a second common line CSL2 transmitting the pulse synchronization signal S2.

The first and second touch drivers 310 and 320 may be commonly connected to the touch controller 330 through first and second common lines CSL1 and CSL2. The first and second touch drivers 310 and 320 may receive the frame synchronization signal S1 through the first common line CSL1. The first and second touch drivers 310 and 320 may receive the pulse synchronization signal S2 through the second common line CSL2. In an embodiment, the frame synchronization signal S1 and the pulse synchronization signal S2 are pulse signals with different periods.

The first and second touch drivers 310 and 320 may apply touch driving signals in response to the frame synchronization signal S1 received from the touch controller 330. The first and second touch drivers 310 and 320 may apply touch driving signals in units of frame sections depending on the frame synchronization signal S1. According to the embodiment, the first touch driver 310 may apply the first touch driving signal to the first touch array TA1 in response to the frame synchronization signal S1. The second touch driver 320 may apply a second touch driving signal to the second touch array TA2 in response to the frame synchronization signal S1. In particular, the first touch driving signal and the second touch driving signal may be synchronized by the frame synchronization signal S1 and generated for each common frame section.

The first and second touch drivers 310 and 320 may generate touch driving signals using the pulse synchronization signal S2 received from the touch controller 330. The first and second touch drivers 310 and 320 may generate a touch driving signal generated using the pulse synchronization signal S2. According to an embodiment, the first touch driver 310 generates a first touch driving signal including pulses with a phase or frequency determined based on the pulse synchronization signal S2. The second touch driver 320 may generate a second touch driving signal including pulses with a phase or frequency determined based on the pulse synchronization signal S2. However, pulses included in each of the first and second touch driving signals may be set to have different frequencies. Details thereabout will be described later with reference to FIGS. 8 and 9.

Figure 8:
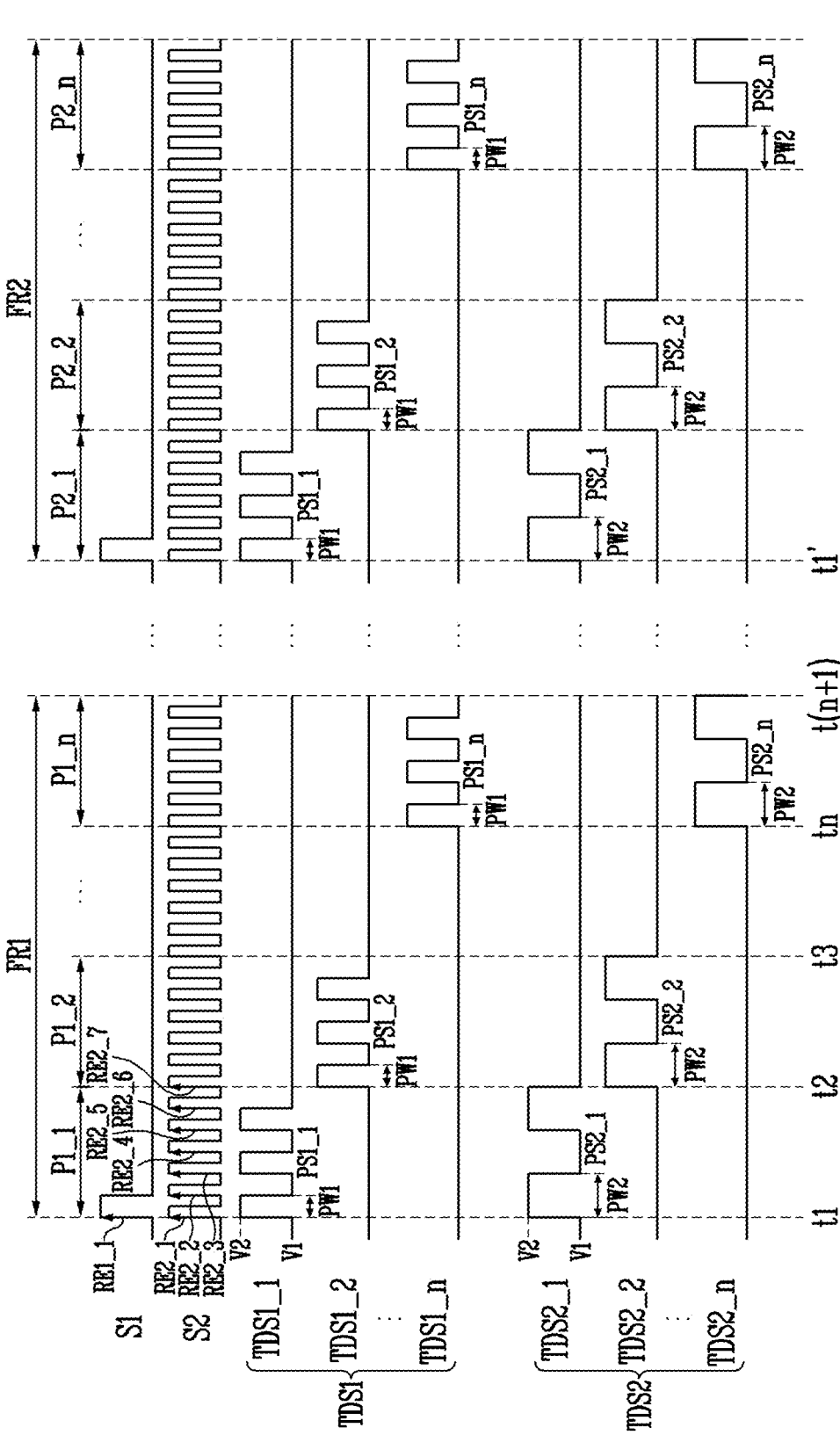
FIG. 8 is a timing diagram showing an embodiment of first and second touch driving signals applied to touch arrays of FIG. 7.

FIG. 8 is a timing diagram showing an embodiment of first and second touch driving signals applied to touch arrays of FIG. 7.

Referring to FIGS. 7 and 8, the display device DD may apply the first touch driving signals TDS1 and the second touch driving signals TDS2 in a frame period unit divided according to the frame synchronization signal S1.

The frame synchronization signal S1 may be toggled at a period corresponding to the frame section. For example, a first time point t1 may be a time point when the frame synchronization signal S1 transitions to a high level and may correspond to the time point when the first frame section FR1 starts. Additionally, a next first time point t1' may be a time point when the frame synchronization signal S1 transitions to a high level again and may correspond to a time point when the second frame section FR2 starts. While, in FIG. 8, the first rising edge RE1_1 of the frame synchronization signal S1 is shown as a start time point of a frame period, a falling edge of the frame synchronization signal S1 may be the start time point of the frame period.

The first touch driving signals TDS1 and the second touch driving signals TDS2 may include pulses that are toggled between the first voltage level V1 and the second voltage level V2.

The first touch driving signals TDS1 may include 1_1-th to 1_n-th pulses PS1_1 to PS1_n. In an embodiment, the 1_1-th to 1_n-th pulses PS1_1 to PS1_n have the same amplitude and frequency. In an embodiment, the 1_1-th to 1_n-th pulses PS1_1 to PS1_n are respectively applied in the 1_1-th to 1_n-th time sections P1_1 to P1_n and do not overlap each other in time.

The second touch driving signals TDS2 may include 2_1-th to 2_n-th pulses PS2_1 to PS2_n. In an embodiment, the 2_1-th to 2_n-th pulses PS2_1 to PS2_n have the same amplitude and frequency. In an embodiment, the 2_1-th to 2_n-th pulses PS2_1 to PS2_n are respectively applied in the 1_1-th to 1_n-th time sections P1_1 to P1_n and do not overlap each other in time.

According to an embodiment, the first and second touch drivers 310 and 320 receive the frame synchronization signal S1 through a commonly connected first common line CSL1. Additionally, the first and second touch drivers 310 and 320 may respectively apply first touch driving signals TDS1 and second touch driving signals TDS2 in the first frame period FR1 in response to the frame synchronization signal S1. In addition, the first and second touch drivers 310 and 320 may respectively apply first touch driving signals TDS1 and second touch driving signals TDS2 in the second frame period FR2 in response to the frame synchronization signal S1. Hereinafter, for convenience of description, only the first frame period FR1 will be described, but the same description may also be applied to the second frame period FR2. For example, in the 2_1-th to 2_n-th time sections P2_1 to P2_n of the second frame period FR2, the 1_1-th to 1_n-th pulses PS1_1 to PS1_n may be applied as the 1_1-th to 1_n-th touch driving signals TDS1_1 to TDS1_n of the first touch driving signals TDS1, respectively. In addition, in the 2_1-th to 2_n-th time sections P2_1 to P2_n of the second frame period FR2, the 2_1-th to 2_n-th pulses PS2_1 to PS2_n may be applied as the 2_1-th to 2_n-th touch driving signals TDS2_1 to TDS2_n of the second touch driving signals TDS2, respectively.

Referring to FIGS. 7 and 8, in the first frame period FR1, the 1_1-th to 1_n-th touch driving signals TDS1_1 to TDS1_n of the first touch driving signals TDS1 may be sequentially applied to the 1_1-th to 1_n-th touch electrodes TX1_1 to TX1_n of the first touch array TA1 respectively. The first frame period FR1 may include 1_1-th to 1_n-th time sections P1_1 to P1_n that are sequentially defined. In the 1_1-th to 1_n-th time sections P1_1 to P1_n, the 1_1-th to 1_n-th touch driving signals TDS1_1 to TDS1_n may be applied, respectively. For example, during the first time section P1_1 corresponding to the first time point t1 to the second time point t2, the 1_1-th touch driving signal TDS1_1 including the 1_1-th pulses PS1_1 may be applied to the 1_1-th touch electrode TX1_1. During the second time section P1_2 corresponding to the second time point t2 to the third time point t3, the 1_2-th touch driving signal TDS1_2 including the 1_2-th pulses PS1_2 may be applied to the 1_2-th touch electrode TX1_2. Additionally, during the n-th time section (P1_n) corresponding to the n-th time point tn to the n+1-th time point t(n+1), the 1_n-th touch driving signal TDS1_n including the 1_n-th pulses PS1_n may be applied to the 1_n-th touch electrode TX1_n.

The 2_1-th to 2_n-th touch driving signals TDS2_1 to TDS2_n of the second touch driving signals TDS2 may be sequentially applied to the 2_1-th to 2_n-th touch electrodes TX2_1 to TX2_n of the second touch array TA2, respectively. In the 1_1-th to 1_n-th time sections P1_1 to P1_n, the 2_1-th to 2_n-th touch driving signals TDS2_1 to TDS2_n may be applied, respectively. For example, during the first time section P1_1, the 2_1-th touch driving signal TDS2_1 including the 2_1-th pulses PS2_1 may be applied to the 2_1-th touch electrode TX2_1. During the second time section P1_2, the 2_2-th touch driving signal TDS2_2 including the 2_2-th pulses PS2_2 may be applied to the 2_2-th touch electrode TX2_2. Additionally, during the n-th time section P1_n, the 2_n-th touch driving signal TDS2_n including the 2_n-th pulses PS2_n may be applied to the 2_n-th touch electrode TX2_n.

According to an embodiment, the first and second touch drivers 310 and 320 receive the pulse synchronization signal S2 through a commonly connected second common line CSL2. The 1_1-th to 1_n-th touch driving signals TDS1_1 to TDS1_n may be generated using the pulse synchronization signal S2. Additionally, the 2_1-th to 2_n-th touch driving signals TDS2_1 to TDS2_n may be generated using the pulse synchronization signal S2.

In an embodiment, pulses of the first touch driving signals TDS1 and pulses of the second touch driving signals TDS2 have different pulse widths, based on the pulse synchronization signal S2. For example, based on the pulse synchronization signal S2, the pulses PS1 of the first touch driving signals TDS1 have a first pulse width PW1 and the pulses PS1 of the second touch driving signals TDS2 have a second pulse width PW2. In FIG. 8, the second pulse width PW2 is larger than the first pulse width PW1, but is not limited thereto. For example, in another embodiment, the second pulse width PW2 is smaller than the first pulse width PW1.

According to an embodiment, during the first time section P1_1, the pulse synchronization signal S2 includes the 2_1-th rising edge RE2_1, the 2_2-th rising edge RE2_2, the 2_3-th rising edge RE2_3, the 2_4-th rising edge RE2_4, the 2_5-th rising edge RE2_5, and the 2_6-th rising edge RE2_6.

The 1_1-th touch driving signal TDS1_1 may transition from the first voltage level V1 to the second voltage level V2 at the odd-numbered rising edges of the pulse synchronization signal S2, for example, at the 2_1-th rising edge RE2_1, the 2_3-th rising edge RE2_3, and the 2_5-th rising edge RE2_5. Additionally, the 1_1-th touch driving signal TDS1_1 may transition from the second voltage level V2 to the first voltage level V1 at the even-numbered rising edges of the pulse synchronization signal S2, for example, at the 2_2-th rising edge RE2_2, the 2_4-th rising edge RE2_4, and the 2_6-th rising edge RE2_6. The 1_1-th pulses PS1_1 of the 1_1-th touch driving signal TDS1_1 formed in this way may have a first pulse width PW1. The 1_2-th to 1_n-th touch driving signals TDS1_2 to TDS1_n may be generated similarly to the 1_1-th touch driving signal TDS1_1 during the 1_2-th to 1_n-th time sections P1_2 to P1_n.

The 2_1-th touch driving signal TDS2_1 may transition from the first voltage level V1 to the second voltage level V2 at some of the odd-numbered rising edges of the pulse synchronization signal S2, for example, at the 2_1-th rising edge RE2_1 and the 2_5-th rising edge RE2_5. Additionally, the 2_1-th touch driving signal TDS2_1 may transition from the second voltage level V2 to the first voltage level V1 at some of the odd-numbered rising edges of the pulse synchronization signal S2, for example, the 2_3-th rising edge RE2_3 and the 2_7-th rising edge RE2_7. The 2_1-th pulses PS2_1 of the 2_1-th touch driving signal TDS2_1 formed in this way may have a second pulse width PW2. In an embodiment, the second pulse width PW2 is twice the first pulse width PW1 but is not limited thereto. The 2_2-th to 2_n-th touch driving signals TDS2_2 to TDS2_n may be generated similarly to the 2_1-th touch driving signal TDS2_1 during the 1_2-th to 1_n-th time sections P1_2 to P1_n.

In this way, the first touch driving signals TDS1 and the second touch driving signals TDS2 may be applied in units of frame periods divided according to the frame synchronization signal S1 received through the first common line CSL1. Additionally, pulses of the first touch driving signals TDS1 and the second touch driving signals TDS2 may be applied at different frequencies depending on the pulse synchronization signal S2 received through the second common line CSL2. Accordingly, the display device DD can cancel EMI noise caused by the touch driving signals applied to the first and second touch arrays TA1 and TA2. Accordingly, the display device DD can have increased image quality and touch performance.

Figure 9:
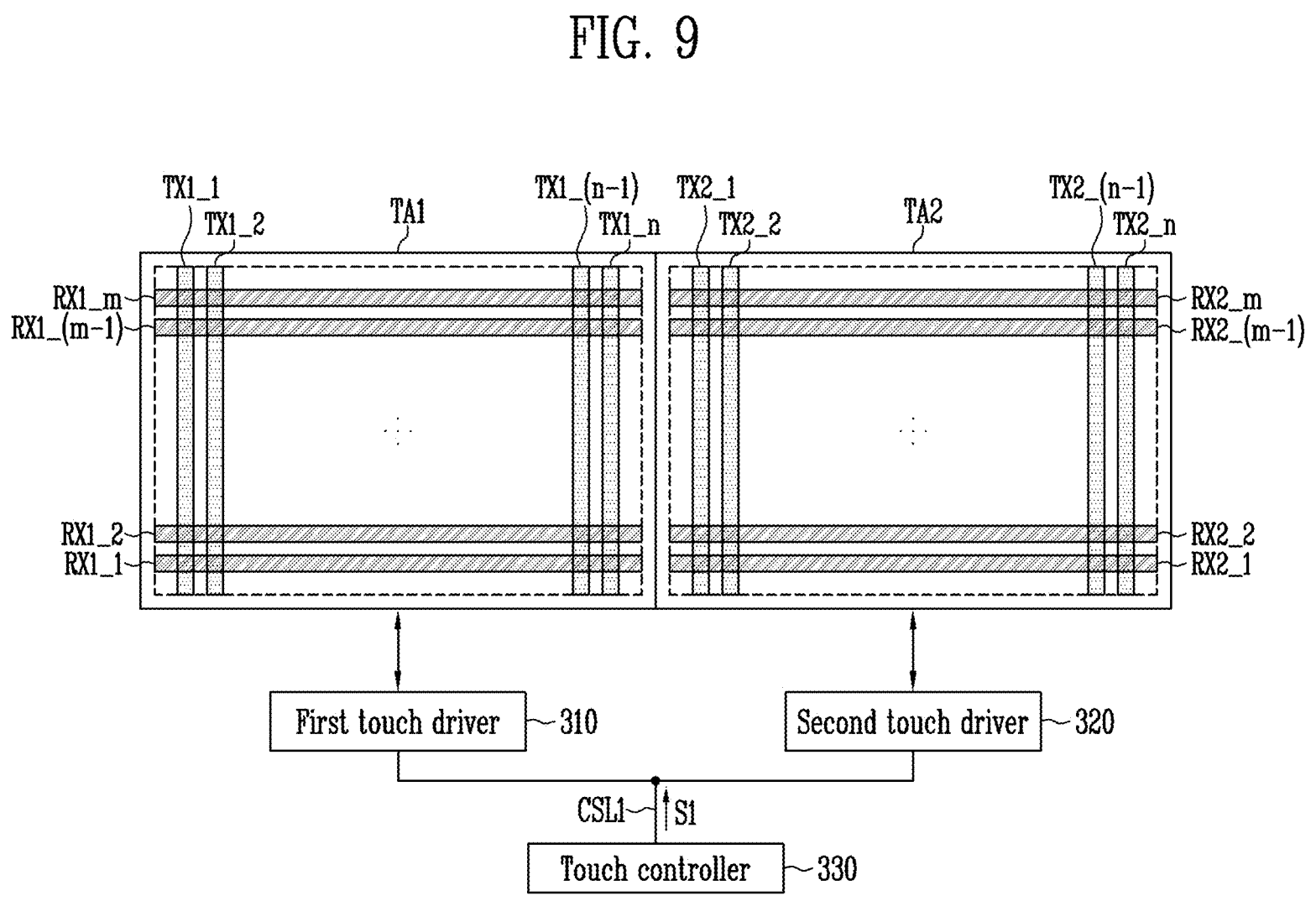

FIG. 9 is a block diagram for illustrating an embodiment of signals provided to first and second touch drivers of FIG. 5.

Referring to FIG. 9, in an embodiment, the display device DD includes one first common line CSL1 commonly connected to the first touch driver 310 and the second touch driver 320. The first common line CSL1 may simultaneously transmit the frame synchronization signal to the first and second touch drivers 310 and 320.

The first and second touch drivers 310 and 320 may be connected to the touch controller 330 through the first common line CSL1. The first and second touch drivers 310 and 320 may receive the frame synchronization signal S1 through the first common line CSL1. In an embodiment, the frame synchronization signal S1 are pulse signals with a constant period.

In an embodiment, the first and second touch drivers 310 and 320 apply touch driving signals with different frequencies in response to the frame synchronization signal S1 received from the touch controller 330. The first and second touch drivers 310 and 320 may apply touch driving signals with different frequencies in units of frame periods divided according to the frame synchronization signal S1. According to an embodiment, the first touch driver 310 applies the first touch driving signal with a first frequency to the first touch array TA1 in response to the frame synchronization signal S1. The second touch driver 320 may apply the second touch driving signal with a second frequency to the second touch array TA2 in response to the frame synchronization signal S1. That is, the first touch driving signal and the second touch driving signal may have different frequencies. However, the first touch driving signal and the second touch driving signal may be synchronized by the frame synchronization signal S1 and applied to a frame period divided by a same time length.

Figure 10:
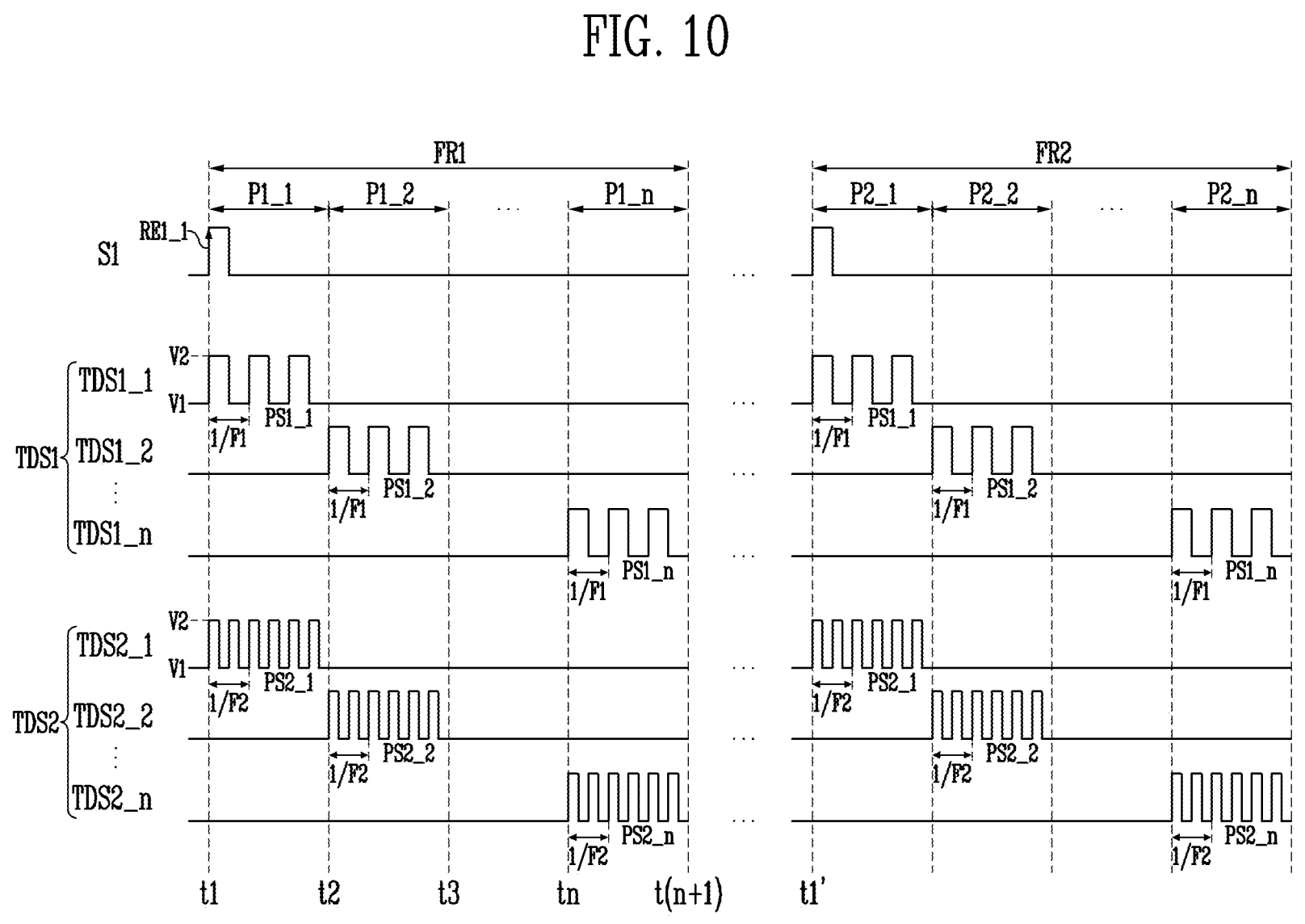

FIG. 10 is a timing diagram showing an embodiment of first and second touch driving signals applied to touch arrays of FIG. 9. To avoid overlapping descriptions with respect to the embodiment of FIG. 8, differences from the above-described embodiment will be mainly described.

Referring to FIGS. 9 and 10, the first and second touch drivers 310 and 320 may receive the frame synchronization signal S1 through a commonly connected first common line CSL1. Additionally, the first and second touch drivers 310 and 320 may apply the first touch driving signals TDS1 and the second touch driving signals TDS2 in the first frame period FR1 in response to the frame synchronization signal S1, respectively. In addition, the first and second touch drivers 310 and 320 may apply the first touch driving signals TDS1 and the second touch driving signals TDS2 in the second frame period FR2 in response to the frame synchronization signal S1, respectively. Hereinafter, for convenience of description, only the first frame period FR1 will be described, but the same description may also be applied to the second frame section FR2. For example, in the 2_1-th to 2_n-th time sections P2_1 to P2_n of the second frame period FR2, the 1_1-th to 1_n-th pulses PS1_1 to PS1_n may be applied as the 1_1-th to 1_n-th touch driving signals TDS1_1 to TDS1_n of the first touch driving signals TDS1, respectively. In addition, in the 2_1-th to 2_n-th time sections P2_1 to P2_n of the second frame period FR2, the 2_1-th to 2_n-th pulses PS2_1 to PS2_n may be applied as the 2_1-th to 2_n-th touch driving signals TDS2_1 to TDS2_n of the second touch driving signals TDS2, respectively.

According to an embodiment, the pulses PS1 included in the first touch driving signals TDS1 and the pulses PS2 included in the second touch driving signals TDS2 have different frequencies. For example, the pulses PS1 included in the first touch driving signals TDS1 have a first frequency F1, and the pulses PS2 included in the second touch driving signals TDS2 have a second frequency F2 different from the first frequency F1. In an embodiment, the second frequency F2 is greater than the first frequency F1.

The first frequency F1 of the pulses PS1 included in the first touch driving signals TDS1 may be set by signals of the first display panel DP1 (see FIG. 1). The second frequency F2 of the pulses PS2 included in the second touch driving signals TDS2 may be set by signals of the second display panel DP2 (see FIG. 1). For example, the first frequency F1 may be set to a frequency at which noise is avoided based on the noise level of the first display panel DP1. Additionally, the second frequency F2 may be set to a frequency at which noise is avoided based on the noise level of the second display panel DP2. More specifically, each of the first and second frequencies F1 and F2 may be set using a frequency hopping technique. The first frequency F1 may be set to one of the hopping frequencies set depending on the signal strength and noise level of the first display panel DP1. The second frequency F2 may be set to one of the hopping frequencies set depending on the signal strength and noise level of the second display panel DP2. That is, the first frequency F1 and the second frequency F2 may be frequencies that can minimize the influence of noise caused by touch driving signals acting on the first and second display panels DP1 and DP2, respectively. However, even if set to one of the hopping frequencies, the first frequency (F1) and the second frequency (F2) may be different frequencies.

Referring to FIGS. 9 and 10, during the first time section P1_1, the 1_1-th touch driving signal TDS1_1 including the 1_1-th pulses PS1_1 of the first frequency F1 may be applied to the 1_1-th touch electrode TX1_1. Additionally, the 2_1-th touch driving signal TDS2_1 including the 2_1-th pulses PS2_1 of the second frequency F2 may be applied to the 2_1-th touch electrode TX2_1.

During the second time section P1_2, the 1_2-th touch driving signal TDS1_2 including the 1_2-th pulses PS1_2 of the first frequency F1 may be applied to the 1_2-th touch electrode TX1_2. Additionally, the 2_2-th touch driving signal TDS2_2 including the 2_2-th pulses PS2_2 of the second frequency F2 may be applied to the 2_2-th touch electrode TX2_2.

During the n-th time section P1_n, the 1_n-th touch driving signal TDS1_n including the 1_n-th pulses PS1_n of the first frequency F1 may be applied to the 1_n-th touch electrode TX1_n. Additionally, the 2_n-th touch driving signal TDS2_n including the 2_n-th pulses PS2_n of the second frequency F2 may be applied to the 2_n-th touch electrode TX2_n.

For example, the first period (1/F1) of the 1_1-th to 1_n-th pulses PS1_1 to PS1_n may be twice the second period (1/F2) of the 2_1-th to 2_n-th pulses PS2_1 to PS2_n. However, this is an example and embodiments are limited to twice.

In this way, the first touch driving signals TDS1 and the second touch driving signals TDS2 may be applied in units of frame periods divided according to the frame synchronization signal S1 received through the first common line CSL1. Additionally, the pulses of the first touch driving signals TDS1 and the second touch driving signals TDS2 may be applied at different frequencies depending on the signals of each of the first and second display panels DP1 and DP2, respectively. Accordingly, the display device DD may apply the touch driving signals of different frequencies to the first and second touch arrays TA1 and TA2, thereby eliminating noise that causes EMI interference generated when driving the display panel or the touch panel. Accordingly, the display device DD can have increased image quality and touch performance.

According to embodiments of the present disclosure, a display device with increased quality is provided.

Effects according to embodiments are not limited by contents exemplified above, and more various effects are included in the present specification.

Although specific embodiments and applications are described herein, other embodiments and variations may be derived from the above description. Accordingly, the spirit of the present disclosure is not limited to these embodiments but extends to the scope of the claims set forth below, various obvious modifications, and equivalents.

What is claimed is:

1. A display device comprising:
a first display panel;
a second display panel disposed adjacent to the first display panel;
a first touch array comprising a plurality of touch electrodes and a plurality of sensing electrodes, the first touch array disposed on the first display panel;
a second touch array comprising a plurality of touch electrodes and a plurality of sensing electrodes, the second touch array disposed on the second display panel;
a first touch driver that applies a first touch driving signal to the first touch array in response to a frame synchronization signal;
a second touch driver that applies a second touch driving signal to the second touch array in response to the frame synchronization signal; and
a common line commonly connected to the first and second touch drivers to transmit the frame synchronization signal, wherein a first frequency of pulses included in the first touch driving signal is different from a second frequency of pulses included in the second touch driving signal.

2. The display device of claim 1, wherein the first frequency is set depending on signals of the first display panel, and the second frequency is set depending on signals of the second display panel.

3. The display device of claim 1, wherein the common line includes a first common line transmitting the frame synchronization signal and a second common line transmitting a pulse synchronization signal, and the first and second touch drivers receive the frame synchronization signal through the first common line and the pulse synchronization signal through the second common line.

4. The display device of claim 3, wherein the first and second touch driving signals are generated using pulses of the pulse synchronization signal.

5. The display device of claim 4, wherein the first and second touch driving signals have different pulse widths.

6. The display device of claim 3, wherein the frame synchronization signal and the pulse synchronization signal are pulse signals with different periods.

7. The display device of claim 1, wherein the first and second display panels are disposed side by side in a first direction or a second direction different from the first direction to display one image.

8. A touch device comprising:

a first touch array comprising a plurality of touch electrodes and a plurality of sensing electrodes;

a second touch array comprising a plurality of touch electrodes and a plurality of sensing electrodes;

a first touch driver that applies a first touch driving signal to the first touch array in response to a frame synchronization signal;

a second touch driver that applies a second touch driving signal to the second touch array in response to the frame synchronization signal; and a common line commonly connected to the first and second touch drivers to transmit the frame synchronization signal, wherein a first frequency of pulses included in the first touch driving signal is different from a second frequency of pulses included in the second touch driving signal.

9. The touch device of claim 8, wherein the first frequency is set depending on signals of a first display panel overlapping the first touch array, and the second frequency is set depending on signals of a second display panel overlapping the second touch array.

10. The touch device of claim 8, wherein the common line includes a first common line transmitting the frame synchronization signal and a second common line transmitting a pulse synchronization signal, and the first and second touch drivers receive the frame synchronization signal through the first common line and the pulse synchronization signal through the second common line.

11. The touch device of claim 10, wherein the first and second touch driving signals are generated using pulses of the pulse synchronization signal.

12. The touch device of claim 11, wherein the first and second touch driving signals have different pulse widths.

13. The touch device of claim 10, wherein the frame synchronization signal and the pulse synchronization signal are pulse signals with different periods.

14. An electronic device comprising:

a first display panel;

a second display panel disposed adjacent to the first display panel;

a first touch array comprising a plurality of touch electrodes and a plurality of sensing electrodes, the first touch array disposed on the first display panel;

a second touch array comprising a plurality of touch electrodes and a plurality of sensing electrodes, the second touch array disposed on the second display panel;

a first touch driver that applies a first touch driving signal at a first frequency to the first touch array in response to a frame synchronization signal; and a second touch driver that applies a second touch driving signal to the second touch array at a second frequency different from the first frequency in response to the frame synchronization signal, wherein the first frequency and the second frequency are frequencies that minimize an influence of noise caused by the touch driving signals acting on the first and second display panels.

15. The electronic device of claim 14, further comprising:

a common line commonly connected to the first and second touch drivers to transmit the frame synchronization signal.

16. The electronic device of claim 15, wherein the common line includes a first common line transmitting the frame synchronization signal and a second common line transmitting a pulse synchronization signal, and the first and second touch drivers receive the frame synchronization signal through the first common line and the pulse synchronization signal through the second common line.

17. The electronic device of claim 16, wherein the first and second touch driving signals are generated using pulses of the pulse synchronization signal.

18. The electronic device of claim 17, wherein the first and second touch driving signals have different pulse widths.

19. The electronic device of claim 16, wherein the frame synchronization signal and the pulse synchronization signal are pulse signals with different periods.

20. The electronic device of claim 14, wherein the first and second display panels are disposed side by side in a first direction or a second direction different from the first direction to display one image.

* * * * *